US009535193B2

United States Patent
Nagasaka et al.

(10) Patent No.: US 9,535,193 B2
(45) Date of Patent: Jan. 3, 2017

(54) IMAGE PROCESSING APPARATUS, IMAGE PROCESSING METHOD, AND STORAGE MEDIUM

(71) Applicant: CASIO COMPUTER CO., LTD., Shibuya-ku, Tokyo (JP)

(72) Inventors: Tomoaki Nagasaka, Tokyo (JP); Akira Hamada, Kanagawa (JP); Ryohei Yamamoto, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 18 days.

(21) Appl. No.: 14/579,540

(22) Filed: Dec. 22, 2014

(65) Prior Publication Data
US 2015/0109520 A1  Apr. 23, 2015

Related U.S. Application Data

(62) Division of application No. 13/845,036, filed on Mar. 17, 2013, now Pat. No. 8,947,585.

(30) Foreign Application Priority Data

Mar. 21, 2012  (JP) ................. 2012-064532

(51) Int. Cl.
G02B 3/00   (2006.01)
G02B 27/00  (2006.01)
(Continued)

(52) U.S. Cl.
CPC ......... G02B 3/0037 (2013.01); G02B 27/0075 (2013.01); G03B 3/00 (2013.01);
(Continued)

(58) Field of Classification Search
CPC .............. G02B 3/0037; G02B 27/0075; H04N 5/23229; H04N 5/235; G06T 5/50; G06T 2200/21; G03B 3/00
(Continued)

(56) References Cited

U.S. PATENT DOCUMENTS 7,732,744 B2  6/2010  Utagawa
8,400,555 B1  3/2013  Georgiev et al.
(Continued)

FOREIGN PATENT DOCUMENTS

CN  101065955 A  10/2007
JP  2000292685 A  10/2000
(Continued)

OTHER PUBLICATIONS

R. Ng et al., "Light Field Photography with a Hand-held Plenoptic Camera", Stanford Tech. Report CTSR Feb. 2005, pp. 1-11.
(Continued)

Primary Examiner — Lin Ye
Assistant Examiner — Marly Camargo
(74) Attorney, Agent, or Firm — Holtz, Holtz & Volek PC

(57) ABSTRACT

An image capturing apparatus includes: an imaging element; a main lens that condenses light from a subject toward the imaging element; a micro lens array that is configured by a plurality kinds of micro lenses with different focal lengths that is disposed between the imaging element and the main lens and causes light transmitted through the main lens to form an image on the imaging element; and a CPU that, in response to receiving a designation of a distance to a side of a subject that is photographed, performs weighting for each image that is imaged by the plurality kinds of micro lenses of the imaging element based on the distance so as to constitute one captured image.

7 Claims, 12 Drawing Sheets

(51) Int. Cl.
*H04N 5/232* (2006.01)
*G06T 5/50* (2006.01)
*G03B 3/00* (2006.01)

(52) U.S. Cl.
CPC ............ *G06T 5/50* (2013.01); *H04N 5/23229* (2013.01); *G06T 2200/21* (2013.01); *G06T 2207/10052* (2013.01)

(58) Field of Classification Search
USPC ............ 348/360, 340, 335, 222.1, 345, 640; 382/255, 254, 276, 278; 396/332; 359/619, 359/626
See application file for complete search history.

(56) References Cited

U.S. PATENT DOCUMENTS

| | | | |
|---|---|---|---|
| 8,698,944 B2 | 4/2014 | Ng et al. | |
| 8,743,245 B2 | 6/2014 | Hiasa et al. | |
| 8,830,382 B2 | 9/2014 | Hayasaka et al. | |
| 2009/0122175 A1* | 5/2009 | Yamagata | G02B 3/0043 348/335 |
| 2009/0140131 A1* | 6/2009 | Utagawa | G02B 3/0056 250/226 |
| 2009/0200623 A1 | 8/2009 | Qian et al. | |
| 2011/0129165 A1 | 6/2011 | Lim et al. | |
| 2012/0050562 A1* | 3/2012 | Perwass | H04N 5/2254 348/222.1 |
| 2015/0156478 A1* | 6/2015 | Ono | H04N 5/2251 348/49 |

FOREIGN PATENT DOCUMENTS

| | | |
|---|---|---|
| JP | 2007004471 A | 1/2007 |
| JP | 2008515110 A | 5/2008 |
| JP | 2009159357 A | 7/2009 |
| JP | 2009532993 A | 9/2009 |
| WO | 2006039486 A2 | 4/2006 |
| WO | 2007115281 A1 | 10/2007 |

OTHER PUBLICATIONS

Chinese Office Action (and English translation thereof) dated Oct. 13, 2015, issued in counterpart Chinese Application No. 201310082781.9.

* cited by examiner

IMAGE PROCESSING APPARATUS, IMAGE PROCESSING METHOD, AND STORAGE MEDIUM

The present application is a Divisional application of U.S. application Ser. No. 13/845,036, filed Mar. 17, 2013, which is based on and claims the benefit of priority from Japanese Patent Application No. 2012-064532, filed Mar. 21, 2012. The contents of both of the above-identified applications are incorporated herein by reference.

BACKGROUND OF THE INVENTION

Field of the Invention

The present invention relates to an image processing apparatus, an image processing method, and a storage medium.

Related Art

In recent years, an image capturing apparatus that introduces information for direction distribution of incident light rays, i.e. an image capturing apparatus called a "plenoptic camera", has been developed (for example, Japanese Unexamined Patent Application (Translation of PCT Publication), Publication No. 2009-532993.

In a plenoptic camera, a microscopic lens array is arranged which is configured by arranging a plurality of micro lenses (hereinafter referred to as "micro-lens") in a grid pattern between a main lens, which is a conventional imaging lens, and the imaging element.

The individual micro-lenses constituting the micro-lens array condense light condensed by the main lens onto a plurality of pixels in the imaging element, depending on the angle at the light ray arrives. The plenoptic camera generates a captured image (hereinafter, referred to as a "light field image") by combining an image condensed onto each of the pixels in the imaging element by the individual micro-lenses (hereinafter, referred to as "sub-image").

The light field image is generated by light irradiated through the conventional main lens, as well as the micro-lenses array in this way. In other words, the light field image not only has spatial information of two-dimensions that is included in a conventional captured image, but as information not included in conventionally captured images, also has directional information of two-dimensions indicating what direction the arriving light rays are from when viewing from the imaging element.

After capturing a light field image by employing such two-dimensional directional information, the plenoptic camera, using the data of this light field image, can reconstruct the figure on a plane separated in front by an arbitrary distance during image capture. In other words, even in a case of having captured a light field image without the plenoptic camera focusing at a predetermined distance, after image capturing, the plenoptic camera can freely produce data of an image (hereinafter referred to as a "reconstructed image") equivalent to an image captured by focusing at this predetermined distance using the data of this light field image.

More specifically, the plenoptic camera sets one point on a plane separated by an arbitrary distance to an attention point, and calculates on which pixels in the imaging element the light from this attention point is distributed via the main lens and the micro-lens array.

In this regard, if each pixel of the imaging element corresponds to each pixel constituting the light field image, for example, then the plenoptic camera integrates the pixel value of at least one pixel on which light from the attention point is distributed, among each of the pixels constituting the light field image. This value thus calculated becomes the pixel value of the pixel corresponding to the attention point in the reconstructed image. The pixel corresponding to the attention point in the reconstructed image is thereby reconstructed.

The plenoptic camera sequentially sets each pixel corresponding to each point on a plane separated by an arbitrary distance from the plenoptic camera (each pixel constituting the reconstructed image) to the attention point, respectively, and repeats the aforementioned sequence of processing, thereby reconstructing data of the reconstructed image (aggregate of pixel values of each pixel of the reconstructed image).

Incidentally, as shown in FIG. 14, a conventional plenoptic camera constitutes a micro lens array with one kind of the micro lens and covers the entire focusing area by the one kind of the micro lens. Therefore, blurring through the micro lens (micro lens blurring) may develop depending on a distance to a subject and a value of a focusing distance of the micro lens, which becomes a hindrance upon generating a reconstructed image of high definition using a light field image captured.

Furthermore, in a case of reducing the thickness of a plenoptic camera, it is necessary to reduce the distance between the main lens and the micro lens array. However, in a case of reducing the distance between the main lens and the micro lens array, the change of magnitude of the micro lens blurring corresponding to the change of the distance to a subject becomes greater. For example, in a case of the distance between the main lens and a subject being infinity, although the micro lens blurring is minimum, the magnitude of the blurring through the micro lens becomes greater as the distance therebetween approaches from infinity.

SUMMARY OF THE INVENTION

A first aspect of the present invention is an image processing apparatus that processes an image captured by an image capturing apparatus that includes an imaging element, a main lens that condenses light from a subject toward the imaging element, and a micro lens array that is configured by a plurality kinds of micro lenses with different focal lengths that is disposed between the imaging element and the main lens and that causes light transmitted through the main lens to form an image on the imaging element. The image processing apparatus includes an image processor that, in response to receiving a designation of a distance to a side of a subject that is photographed, performs weighting for each image that is imaged by the plurality of kinds of micro lenses based on the distance so as to constitute one captured image. The plurality of kinds of micro lenses include a first micro lens having a first focusing distance and a second micro lens having a second focusing distance that is greater than the first focusing distance. And in a case of the distance being greater than a predetermined distance, the image processor makes a first weighting value of a first image formed by the first micro lens smaller than a second weighting value of a second image formed by the second micro lens, and in a case of the distance being smaller than the predetermined distance, the image processor makes the first weighting value greater than the second weighting value.

A second aspect of the present invention is an image processing method of performing image processing on an image captured by an image capturing apparatus that includes an imaging element, a main lens that condenses light from a subject toward the imaging element, and a micro lens array that is configured by a plurality kinds of micro lenses with different focal lengths that is disposed between the imaging element and the main lens and that causes light transmitted through the main lens to form an image on the imaging element. The method includes, in response to receiving a designation of a distance to a side of a subject that is photographed, performing weighting for each image that is imaged by the plurality of kinds of micro lenses based on the distance so as to constitute one captured image. The plurality of kinds of micro lenses comprise a first micro lens having a first focusing distance and a second micro lens having a second focusing distance that is greater than the first focusing distance. And in performing the weighting, in a case of the distance being greater than a predetermined distance, a first weighting value of a first image formed by the first micro lens is made smaller than a second weighting value of a second image formed by the second micro lens, and in a case of the distance being smaller than the predetermined distance, the first weighting value is made greater than the second weighting value.

A third aspect of the present invention is a computer-readable storage medium that stores a program that causes a computer of an image processing apparatus to perform image processing on an image captured by an image capturing apparatus that includes an imaging element, a main lens that condenses light from a subject toward the imaging element, and a micro lens array that is configured by a plurality kinds of micro lenses with different focal lengths that is disposed between the imaging element and the main lens and that causes light transmitted through the main lens to form an image on the imaging element. The program causes the computer to perform processing including, in response to receiving a designation of a distance to a side of a subject that is photographed, performing weighting for each image that is imaged by the plurality kinds of micro lenses based on the distance so as to constitute one captured image. The plurality of kinds of micro lenses comprise a first micro lens having a first focusing distance and a second micro lens having a second focusing distance that is greater than the first focusing distance. And in performing the weighting, in a case of the distance being greater than a predetermined distance, a first weighting value of a first image formed by the first micro lens is made smaller than a second weighting value of a second image formed by the second micro lens, and in a case of the distance being smaller than the predetermined distance, the first weighting value is made greater than the second weighting value.

DETAILED DESCRIPTION OF THE INVENTION

Hereinafter, an embodiment of the present invention will be explained based on the drawings.

Figure 1:
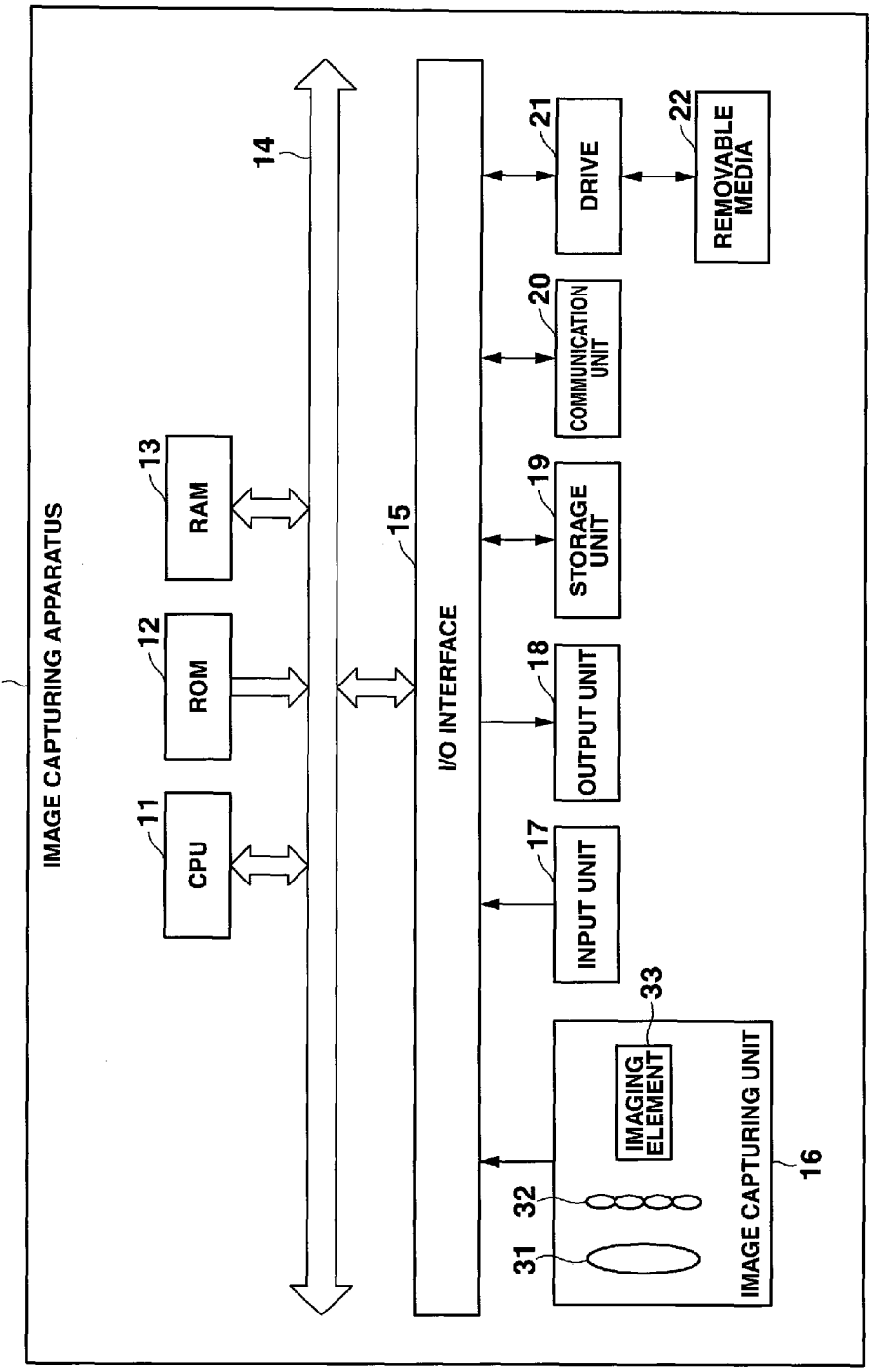
FIG. 1 is a block diagram showing the hardware configuration of an image capturing apparatus 1 according to an embodiment of the present invention.

FIG. 1 is a block diagram showing the hardware configuration of an image capturing apparatus 1 according to an embodiment of the present invention.

The image capturing apparatus 1 includes a CPU (Central Processing Unit) 11, ROM (Read Only Memory) 12, RAM (Random Access Memory) 13, a bus 14, an I/O interface 15, an image capturing unit 16, an input unit 17, an output unit 18, a storage unit 19, a communication unit 20, and a drive 21.

The CPU 11 executes a variety of processing in accordance with a program recorded in the ROM 12, or a program loaded from the storage unit 19 into the RAM 13.

The necessary data and the like upon the CPU 11 executing the variety of processing are stored in the RAM 13 as appropriate.

The CPU 11, ROM 12 and RAM 13 are connected to each other through the bus 14. The I/O interface 15 is also connected to this bus 14. The image capturing unit 16, input unit 17, output unit 18, storage unit 19, communication unit 20 and drive 21 are connected to the I/O interface 15.

The image capturing unit 16 includes a main lens 31, a micro-lens array 32, and an imaging element 33. It should be noted that further details of the image capturing unit 16 will be explained later while referring to FIG. 2.

The input unit 17 is configured by a variety of buttons such as a shutter button (not illustrated) and a variety of buttons such as an operation button for determining a distance between the main lens 31 and a reconstructed plane described later, and inputs a variety of information in accordance with a command operation of the user.

The output unit 18 is configured by a monitor, speaker, etc., and outputs various images and various sounds.

The storage unit 19 is configured by a hard disk, DRAM (Dynamic Random Access Memory), or the like, and stores the data of various images such as light field images and reconstructed images, which are described later.

The communication unit 20 controls communication with other apparatuses (not illustrated) via a network including the internet.

Removable media 22 consisting of magnetic disks, optical disks, magneto-optical disks, semiconductor memory, or the like, are installed in the drive 21 as appropriate. Programs read from the removable media 22 by the drive 21 are installed in the storage unit 19 as necessary. Similarly to the storage unit 19, the removable media 22 can also store a variety of data such as the data of images stored in the storage unit 19.

In the following, the main lens 31, the micro lens array 32, and the imaging element 33 constituting the image capturing unit 16 will be explained in further detail.

Figure 2:
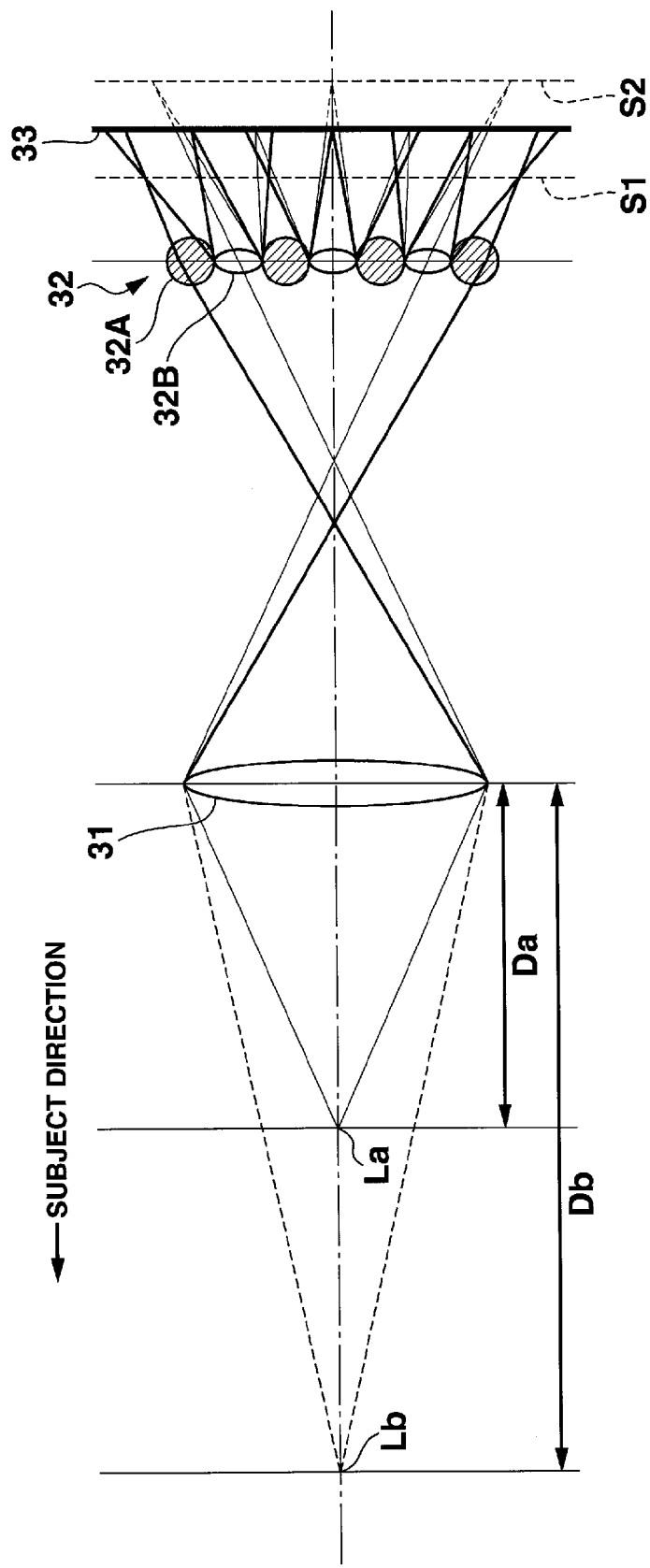
FIG. 2 is a schematic diagram showing a configuration example of an optical system in an image capturing unit constituting the abovementioned image capturing apparatus.

FIG. 2 is a schematic diagram showing a configuration example of an optical system in the image capturing unit 16.

As shown in FIG. 2, as each element constituting the image capturing unit 16, the main lens 31, the micro lens array 32, and the imaging element 33 are arranged in order from closest to a subject.

The main lens 31 condenses light from the subject toward the imaging element 33.

As described above, the micro lens array 32 is disposed between the main lens 31 and the imaging element 33 and causes the light transmitted through the main lens 31 to form an image on the imaging element 33.

Figure 3:
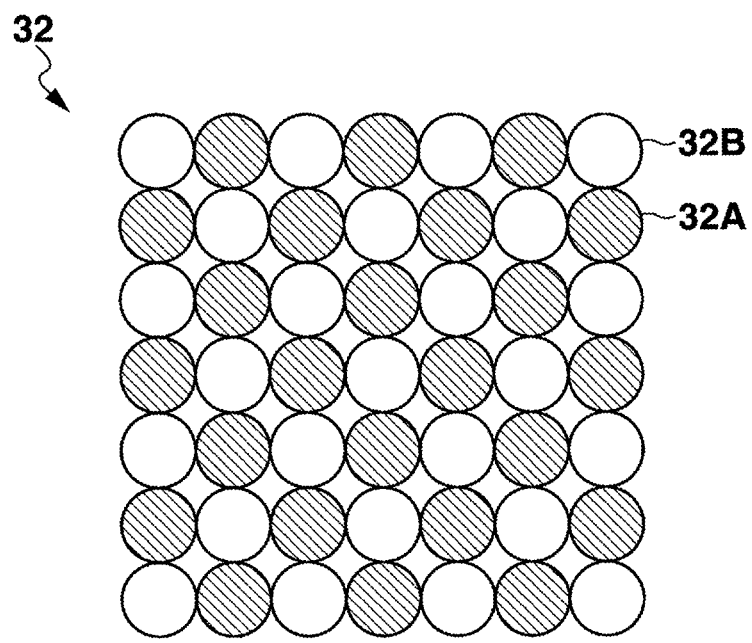
FIG. 3 is a front view of a micro lens array constituting the abovementioned image capturing apparatus.

FIG. 3 is a front view of the micro lens array 32.

As shown in FIG. 3, the micro lens array 32 is configured by two kinds of micro lenses 32A and 32B. These micro lenses 32A and 32B are micro lenses having respectively different focusing distances, and are arranged alternately. It should be noted that, although seven micro lenses are arranged in a single row in FIGS. 2 and 3, this arrangement is a simplified configuration used for convenience of explanation, and thus it is practically possible to arrange more micro lenses.

The plurality of micro lenses 32A and 32B constituting the micro lens array 32 condenses the light incident via the main lens 31 to cause a sub-image to form an image on the imaging element 33. In this way, on the imaging element 33, a light field image is generated which is an aggregate of this plurality of sub-images.

The imaging element 33 is configured by a CMOS (Complementary Metal Oxide Semiconductor) type photo-electric conversion element, etc. On the imaging element 33, an image of the subject is incident via the micro lens array 32 from the main lens 31. The imaging element 33 photo-electrically converts (captures) an image of the subject, accumulates an image signal for a predetermined period of time, and sequentially supplies the image signal thus accumulated to an AFE (Analog Front End) (not illustrated) as an analog signal.

The AFE performs various signal processing such as A/D (Analog/Digital) conversion processing and the like on this analog image signal. A digital signal is generated by various signal processing and provided as data of a light field image from the AFE to the CPU 11 (FIG. 1) and the like as appropriate.

Furthermore, FIG. 2 shows a light beam in a case of irradiating light toward the main lens 31 from a light source La disposed at a location away from the center of the main lens 31 by a distance of Da (solid line shown in FIG. 2) as well as a light beam in a case of irradiating light toward the main lens 31 from a light source Lb disposed at a location away from the center of the main lens 31 by a distance of Db (dashed line shown in FIG. 2).

As shown in FIG. 2, in a case of irradiating light from the light source La, the light condensed by the micro lens 32A forms an image on the plane of the imaging element 33. On the other hand, the light condensed by the micro lens 32B forms an image on a plane S2 behind the plane of the imaging element 33. Therefore, a sub-image forming an image on the imaging element 33 by the micro lens 32B is in a state of blurring (micro lens blurring).

Furthermore, in a case of irradiating light from the light source Lb, the light condensed by the micro lens 32B forms an image on the plane of the imaging element 33. On the other hand, the light condensed by the micro lens 32A forms an image on a plane S1 in front of the plane of the imaging element 33. Therefore, a sub-image forming an image on the imaging element 33 by the micro lens 32A is in a state of blurring (micro lens blurring).

Figure 4:
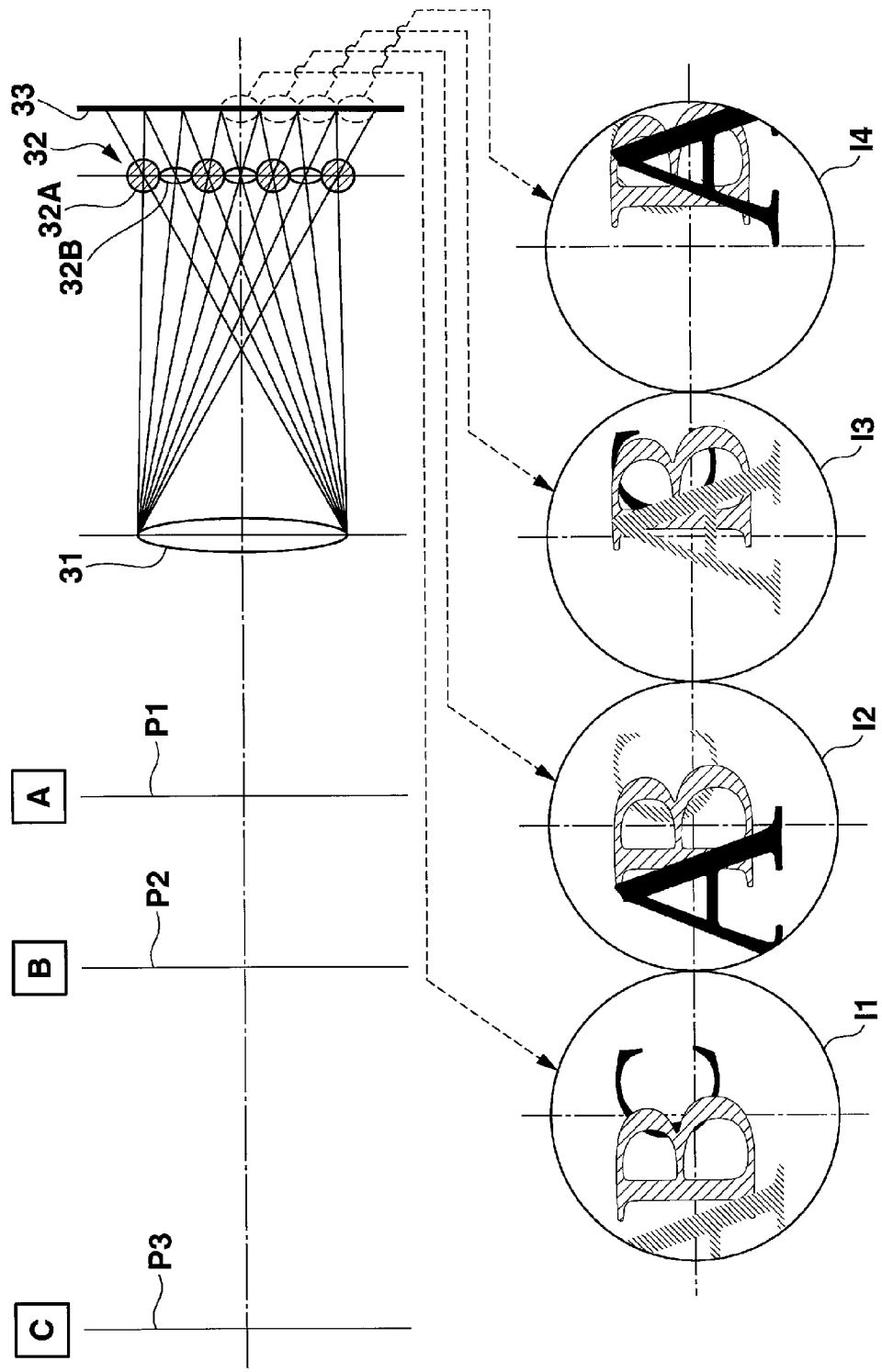
FIG. 4 is a view showing an example of a sub-image in a case of using a micro lens array constituting the abovementioned image capturing apparatus.

FIG. 4 is a view showing an example of a sub-image in a case of using the micro lens array 32.

FIG. 4 shows sub-images I1, I2, I3, and I4 in a case of transparent planar plates P1, P2, and P3 being arranged in the order of closest to the main lens 31.

Here, the characters "A", "B", and "C" are displayed in the same color (for example, black color) on the planar plates P1, P2, and P3, respectively.

The sub-images I1 to I3 are images forming an image by the micro lens 32B. Since the focusing distance of the micro lens 32B is longer than that of the micro lens 32A, the character "C" displayed on the planar plate P3 which is the most distant from the main lens 31 comes into focus. As a result of this, the character "C" is clearly displayed as compared to the other characters on the sub-images I1 and I3.

On the other hand, the sub-images I2 and I4 are images forming an image by the micro lens 32A. Since the focusing distance of the micro lens 32A is shorter than that of the micro lens 32B, the character "A" displayed on the planar plate P1 which is the closest from the main lens 31 comes into focus. As a result of this, the character "A" is clearly displayed as compared to the other characters on the sub-images I2 and I4.

In addition, the respective characters are displayed at different positions in the sub-images I1 to I4. This is because each micro lens is disposed at a different position, which causes parallax with respect to a subject (here, the characters "A", "B", and "C").

Here, a case of the image capturing apparatus 1 generating data of a reconstructed image from data of a light field image is considered. In this case, the CPU 11 of the image capturing apparatus 1 functions as an image constructing unit. In the following, processing of generating data of a reconstructed image by the CPU 11 is called reconstruction processing.

More specifically, in response to the input unit 17 receiving an operation of designating a distance between the main lens 31 and a plane of a reconstruction target (hereinafter, referred to as a reconstructed plane), the CPU 11 of the image capturing apparatus 1 sets a pixel of the reconstructed plane as an attention point. Then, the CPU 11 calculates on which pixels within the imaging element 33 the light from the attention point is distributed via the main lens 31 and the micro-lens array 32.

Figure 5:
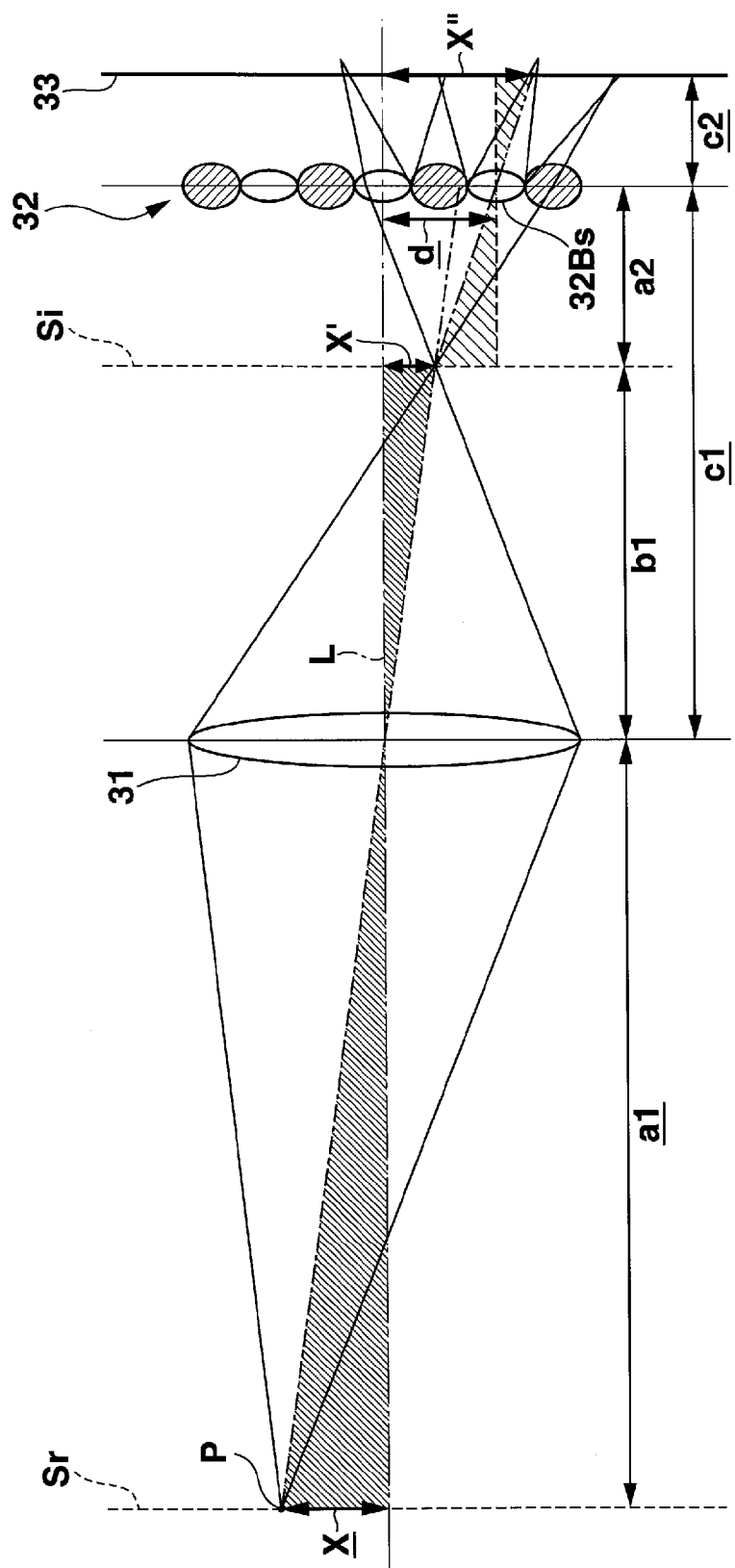
FIG. 5 is a view illustrating a state in which light from an attention point is distributed to pixels in an image capturing element of the abovementioned image capturing apparatus.

FIG. 5 is a view illustrating a state in which light from the attention point is distributed to pixels in the image capturing element 33.

In FIG. 5, with a point at which a straight line L extending in a light axis direction from the center point of the lens and the reconstructed plane Sr intersect as a central position, a point that is located away above from this central position by the distance x is set as an attention point P. In the following, a state is explained in which light irradiating onto one micro lens 32Bs constituting the micro lens 32B from this attention point P is distributed to pixels in the imaging element 33.

Each distance in FIG. 5 is defined as follows.

a1: distance between main lens 31 and reconstructed plane Sr b1: distance between main lens 31 and imaging plane Si of main lens 31 c1: distance between main lens 31 and micro lens array 32 a2: distance between imaging plane Si of main lens 31 and micro lens array 32 c2: distance between micro lens array 32 and imaging element 33 d: distance between straight line L and central position of micro lens 32Bs x': distance between focal point of main lens 31 and straight line L x'': distance between position on imaging element 33 to which light distributed reaches and straight line L It should also be noted that the focusing distance of the main lens 31 is fML. In addition, the distances x, a1, c1, c2, and d, which are denoted with underlines in FIG. 5, are defined beforehand. It should also be noted that the abovementioned distances respectively indicate the shortest distances.

In this case, the distances b1, a2, x', and x'', which are not defined beforehand, are represented by the following formulae (1) to (4) using the lens equation.

$$b1 = \frac{a1 - f_{ML}}{a1 \times f_{ML}} \quad (1)$$

$$a2 = c1 - b1 \quad (2)$$

$$x' = x \times \frac{b1}{a1} \quad (3)$$

$$x'' = (d - x') \times \frac{c2}{a2} + d \quad (4)$$

With the above formula (4), the light irradiating onto the micro lens 32Bs from the attention point P is distributed to pixels corresponding to the distance x'' in the imaging element 33.

Then, the CPU 11 calculates positions of pixels distributed by each micro lens and determines the pixel value of the attention point P by calculating the arithmetic mean of the pixel values of these positions.

The CPU 11 of the image capturing apparatus 1 sets each pixel of a reconstructed image as an attention point and generates data of the reconstructed image by performing the abovementioned calculation. Here, in the case of calculating the arithmetic mean of the pixel values to which the light from the attention point P is distributed, the CPU 11 performs weighing of each image that is imaged by a plurality of micro lenses 32A and 32B of the imaging element 33 based on the distance designated by the input unit 17 (the distance from the reconstructed plane Sr to the main lens 31) so as to construct one captured image.

Figure 6:
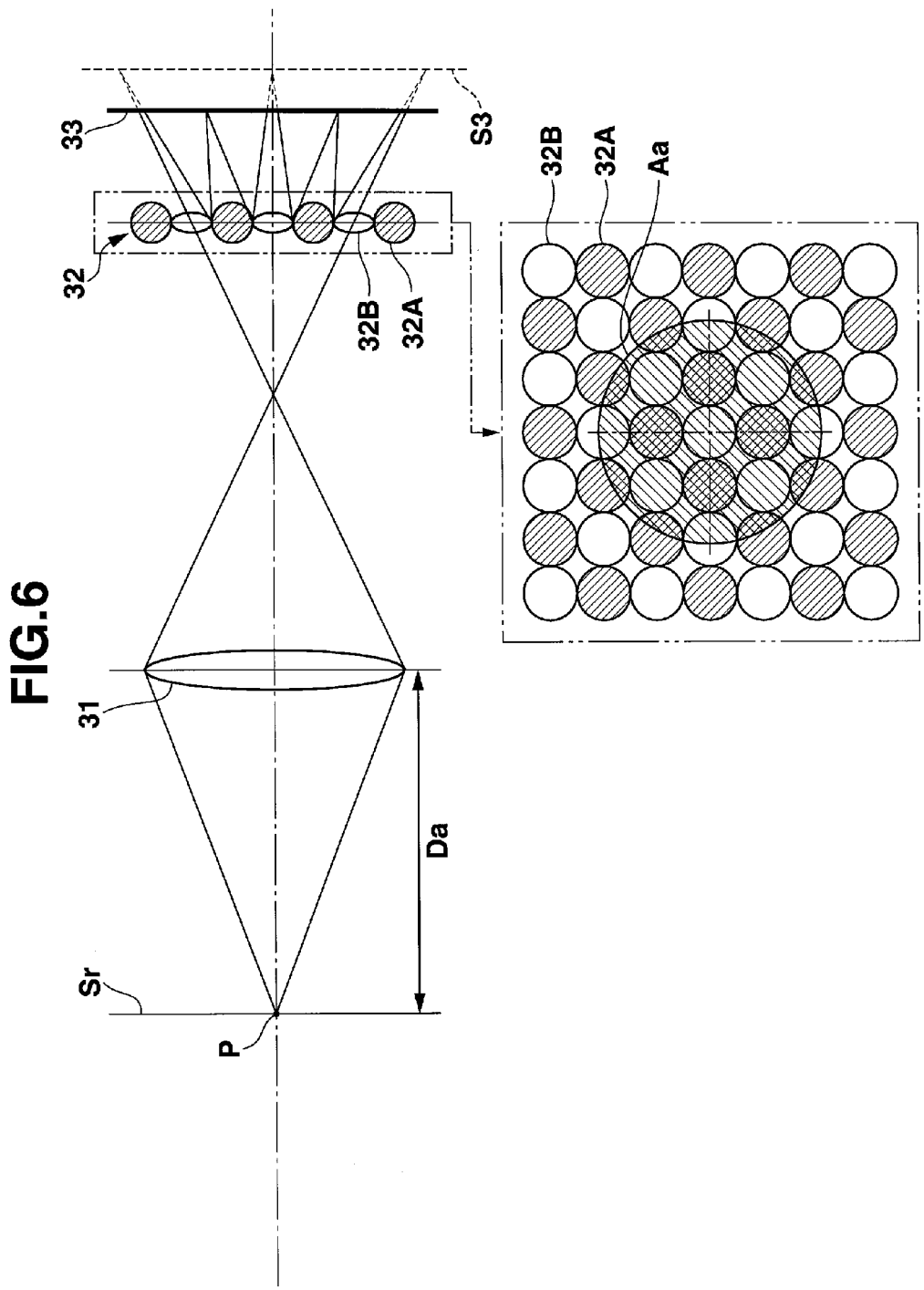
FIG. 6 is a view illustrating processing in a case of a distance between a reconstructed plane and a main lens constituting the abovementioned image capturing apparatus being Da.
Figure 7:
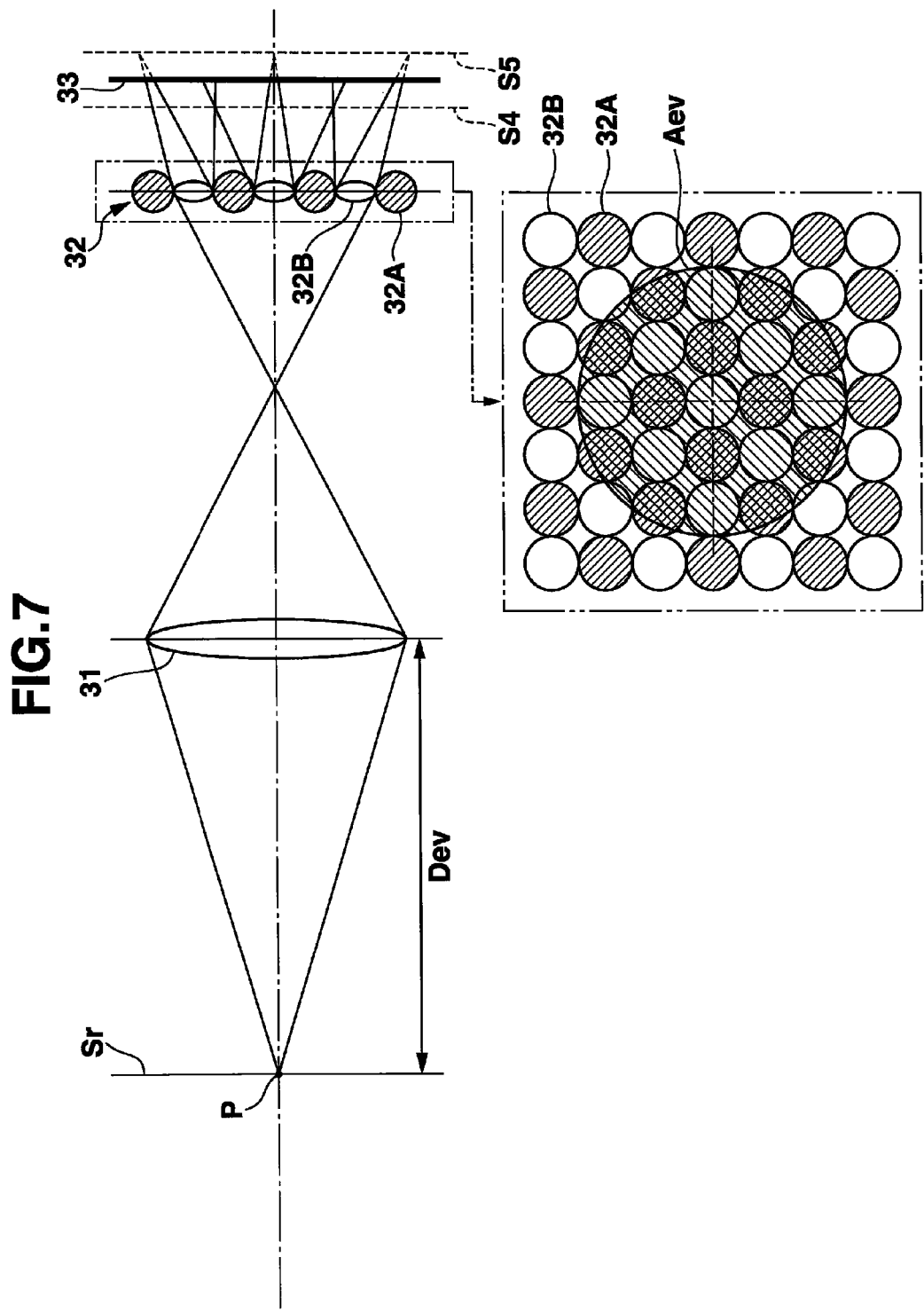
FIG. 7 is a view illustrating processing in a case of the distance between a reconstructed plane and a main lens constituting the abovementioned image capturing apparatus being Dev.
Figure 8:
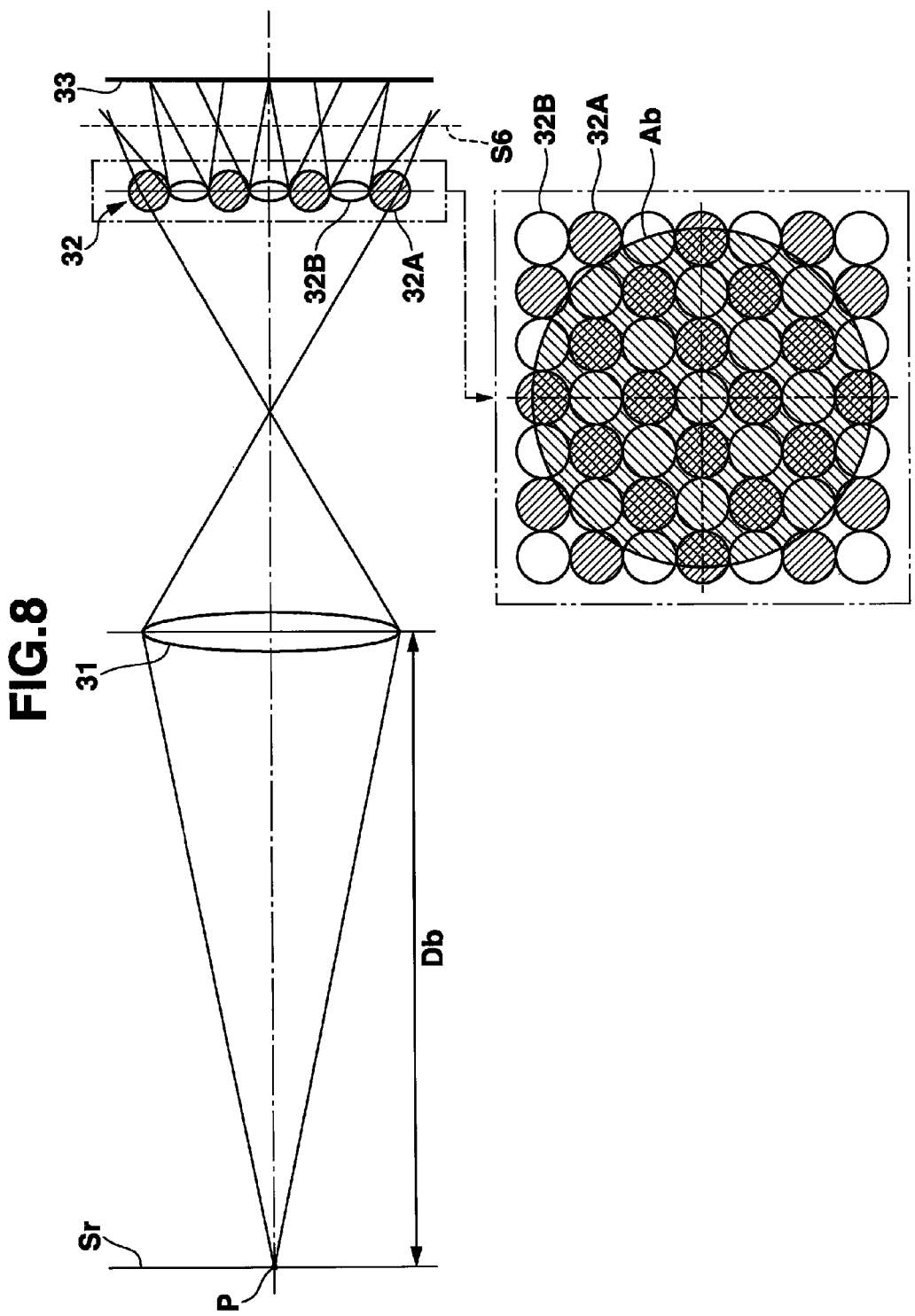
FIG. 8 is a view illustrating processing in a case of a distance between a reconstructed plane and a main lens constituting the abovementioned image capturing apparatus being Db.

With reference to FIGS. 6 to 8, processing of weighting each image that is imaged by a plurality of micro lenses 32A and 32B is explained in detail in the following.

FIG. 6 is a view illustrating processing in a case of the distance between the main lens 31 and the reconstructed plane Sr being Da. FIG. 7 is a view illustrating processing in a case of the distance between the main lens 31 and the reconstructed plane Sr being Dev. FIG. 8 is a view illustrating processing in a case of the distance between the main lens 31 and the reconstructed plane Sr being Db. Here, Dev is a value greater than Da and smaller than Db. Furthermore, FIGS. 6 to 8 are explained with the position where a straight line extending in a light axis direction from the central position of the lens and the reconstructed plane Sr intersect being set as the attention point P.

In FIG. 6, light irradiated from the attention point P is deflected at the main lens 31 to be incident on the micro lens array 32. In this case, the area on which the light is incident in the micro lens array 32 is the area Aa shown in the front view of the micro lens array 32 of FIG. 6. Pixels included in a sub-image that is imaged by the micro lenses corresponding to this area Aa are the pixels that are targets for arithmetic mean. Then, the CPU 11 performs weighting by multiplying values of the pixels included in a sub-image that is imaged by the micro lenses corresponding to this area Aa (pixel values) by a weighting value, and calculates the arithmetic mean of the pixel values thus weighted.

More specifically, in a case of the distance between the main lens 31 and the reconstructed plane Sr being Da, the CPU 11 sets 1.0 as a weighting value of pixels corresponding to an area of a sub-image that is imaged by the micro lenses 32A corresponding to the area Aa. Furthermore, in a case of the distance between the main lens 31 and the reconstructed plane Sr being Da, the CPU 11 sets 0 as a weighting value of pixels corresponding to an area of a sub-image that is imaged by the micro lenses 32B corresponding to the area Aa.

In the case of the distance being Da, the light condensed by the micro lenses 32A of which the focusing distance is short is imaged at a plane of the imaging element 33 as shown in FIG. 6. On the other hand, the light condensed by the micro lenses 32B having a long focusing distance forms an image at a plane S3 behind the imaging element 33; therefore, blurring (micro lens blurring) occurs on a subimage that is imaged on the imaging element 33. In this case, since the image capturing apparatus 1 generates a reconstructed image by setting a weighting value of pixels corresponding to light generated by the micro lens blurring lower relative to a weighting value of pixels corresponding to light that is imaged on a plane of the imaging element 33, it is possible to establish a reconstructed image of high definition.

In FIG. 7, light irradiated from the attention point P is deflected at the main lens 31 to be incident on the micro lens array 32. In this case, the area Aev of the micro lens array 32 is an area that is wider than the area Aa shown in FIG. 6. The CPU 11 performs weighting by multiplying pixel values of the pixels included in an area of a sub-image that is imaged by the micro lenses corresponding to this area Aev by a weighting value, and calculates the arithmetic mean of the pixel values thus weighted.

More specifically, in a case of the distance between the main lens 31 and the reconstructed plane Sr being Dev, the CPU 11 sets 0.5 as a weighting value of pixels corresponding to a sub-image that is imaged by the micro lenses 32A and 32B corresponding to the area Aev.

The light condensed by each micro lens 32A is imaged at a plane S4 in front of the imaging element 33 and the light condensed by each micro lens 32B is imaged at a plane S5 behind the imaging element 33. In this case, since the image capturing apparatus 1 makes the arithmetic mean by divides in half a weighting value of pixels corresponding to each of micro lenses 32A and 32B, respectively, it is possible to establish a reconstructed image of high definition.

In FIG. 8, light irradiated from the attention point P is deflected at the main lens 31 to be incident on the micro lens array 32. In this case, the area of the micro lens array 32 on which the light is incident is the area Ab shown in the front view of the micro lens array 32 of FIG. 8. This area Ab is wider than the area Aev shown in FIG. 7. Then, the CPU 11 performs weighting by multiplying pixel values of the pixels included in an area of a sub-image that is imaged by the micro lenses corresponding to this area Ab by a weighting value, and calculates the arithmetic mean of the pixel values thus weighted.

More specifically, in a case of the distance between the main lens 31 and the reconstructed plane Sr being Db, the CPU 11 sets 0 as a weighting value of pixels included in an area of a sub-image that is imaged by the micro lenses 32A corresponding to the area Ab. Furthermore, in a case of the distance between the main lens 31 and the reconstructed plane Sr being Db, the CPU 11 sets 1.0 as a weighting value of pixels included in an area of a sub-image that is imaged by the micro lenses 32B corresponding to the area Ab.

In the case of the distance being Db, the light condensed by the micro lenses 32A having a short focusing distance, as shown in FIG. 8, forms an image at a plane S6 in front of the imaging element 33; therefore, blurring (micro lens blurring) occurs on a sub-image that is imaged on the imaging element 33. On the other hand, the light condensed by the micro lenses 32B having a long focusing distance forms an image at a plane of the imaging element 33. In this case, since the image capturing apparatus 1 generates a reconstructed image by setting a weighting value of pixels corresponding to light generated by the micro lens blurring lower relative to a weighting value of pixels corresponding to light forming an image on a plane of the imaging element 33, it is possible to establish a reconstructed image of high definition.

Figure 9:
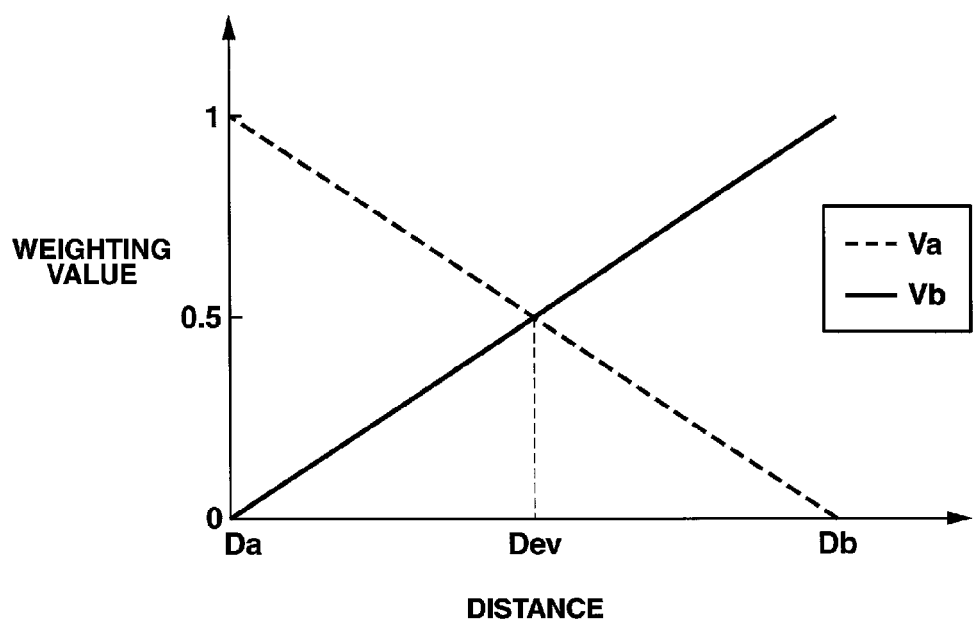
FIG. 9 is a graph showing an example of a relationship between a weighting value and a distance between a reconstructed plane and a main lens constituting the abovementioned image capturing apparatus.

FIG. 9 is a graph showing a relationship between weighting values of the micro lenses 32A and 32B. In FIG. 9, the horizontal axis represents the distance between the main lens 31 and the reconstructed plane Sr and the vertical axis represents the weighting value of pixels at a position corresponding to an image that is imaged by the micro lens. Furthermore, in FIG. 9, the dashed line represents a weighting value Va of pixels corresponding to the micro lens 32A and the solid line represents a weighting value Vb of pixels corresponding to the micro lens 32B.

As shown in FIG. 9, in a case of the distance being Da, Va is 1 and Vb is 0. In a case of the distance being Db, Va is 0 and Vb is 1. Therefore, if an arbitrary distance between Da and Db is Dx, Va and Vb are represented by the following formulae (5) and (6).

$$Va = -\frac{1}{Db-Da} \cdot Dx + \frac{Db}{Db-Da} \quad (5)$$

$$Vb = \frac{1}{Db-Da} \cdot Dx - \frac{Da}{Db-Da} \quad (6)$$

In other words, upon receiving the distance Dx by the input unit 17, the image capturing apparatus 1 determines Va and Vb based on the formulae (5) and (6).

Figure 10:
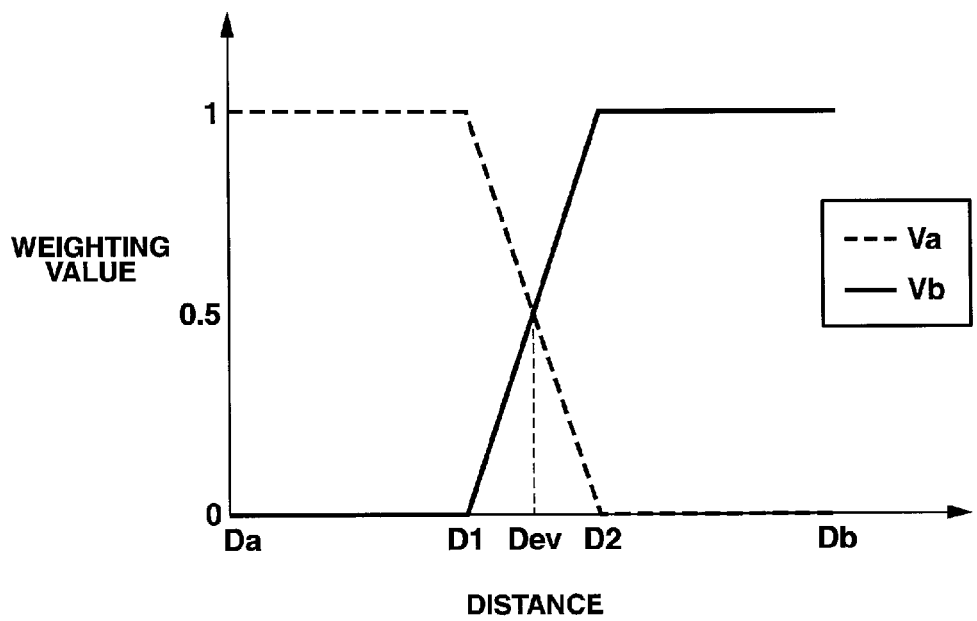
FIG. 10 is a graph showing another example of a relationship between a weighting value and a distance between a reconstructed plane and a main lens constituting the abovementioned image capturing apparatus.

It should be noted that, although the image capturing apparatus 1 determines a weighting value of pixels corresponding to the micro lens 32A and a weighting value of pixels corresponding to the micro lens 32B from the relationship of weighting values shown in FIG. 9, the present invention is not limited thereto, and the weighting value of each pixel may be changed as shown in FIG. 10. That is to say, in the case of the distance Dx being between Da and D1, Va is 1 and Vb is 0; in the case of the distance Dx being between D2 and Db, Va is 0 and Vb is 1. Furthermore, in the case of the distance being between D1 and D2, Va and Vb are calculated based on the formulae (7) and (8).

$$Va = -\frac{1}{D2-D1} \cdot Dx + \frac{D2}{D2-D1} \quad (7)$$

$$Vb = \frac{1}{D2-D1} \cdot Dx - \frac{D1}{D2-D1} \quad (8)$$

In this way, since the range of distance in which the weighting value corresponding to the two kinds of the micro lenses 32A and 32B is 0 increases, it is possible to reduce the processing load by reducing the frequency of calculating using pixels corresponding to an image that is imaged by each of the two kinds of the micro lenses 32A and 32B.

Figure 11:
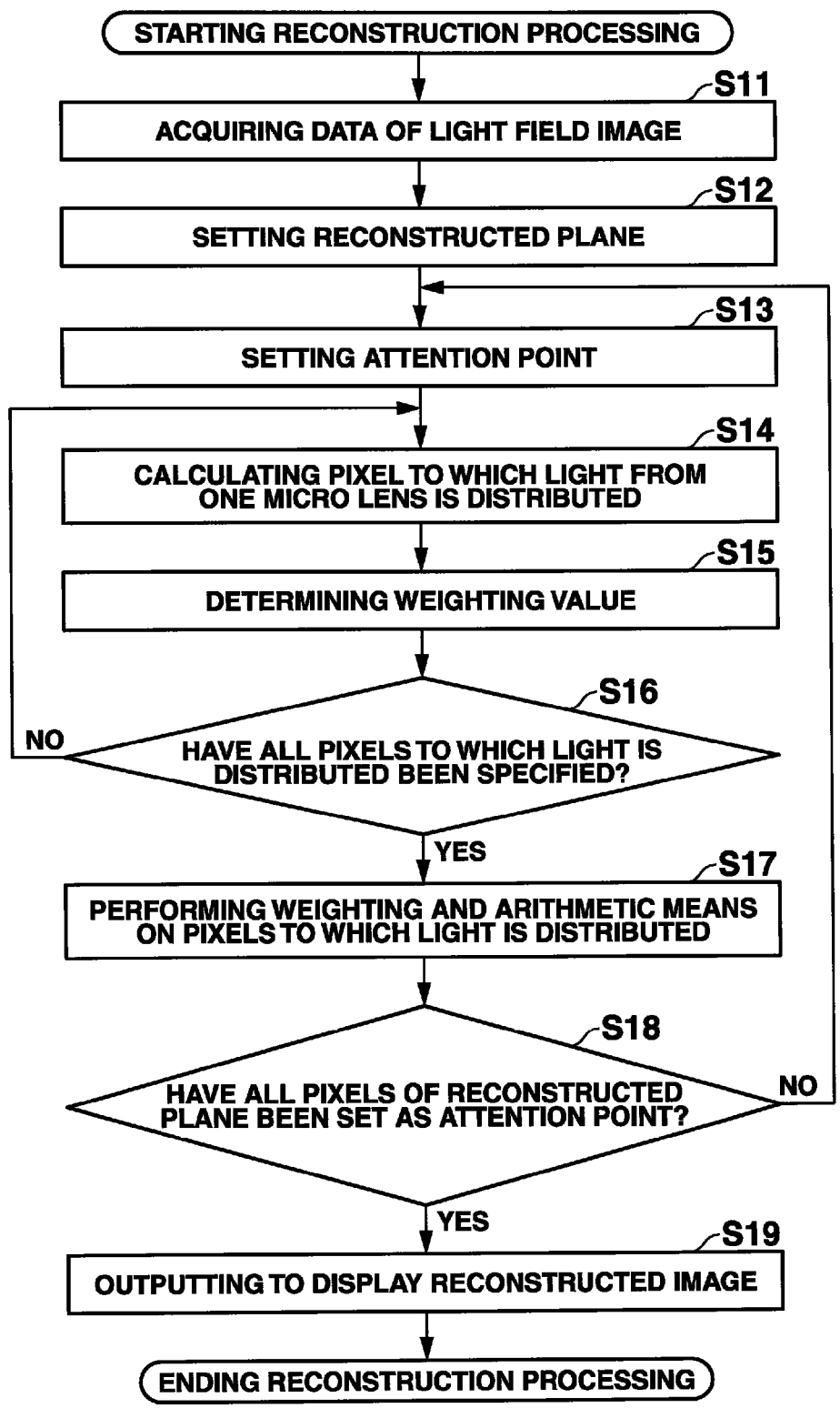
FIG. 11 is a flow chart showing a flow of reconstruction processing in the abovementioned image capturing apparatus.

Next, the flow of reconstruction processing by the CPU 11 will be explained. FIG. 11 is a flow chart showing the flow of the reconstruction processing.

In Step S11, the CPU 11 acquires data of a light field image.

In Step S12, the input unit 17 receives an operation of designating the distance between the main lens 31 and the reconstructed plane, and the CPU 11 sets a plane located at a position ahead of the distance thus designated from the main lens 31 as a reconstructed plane.

In Step S13, the CPU 11 sets a pixel constituting a reconstructed plane as an attention point P. It should also be noted that, in a case of setting a pixel constituting a reconstructed plane as an attention point P, a pixel not yet set as an attention point P is set as an attention point P.

In Step S14, the CPU 11 calculates pixels to which light from one micro lens is distributed. In other words, the CPU 11 selects one micro lens among micro lenses constituting the micro lens array 32 and calculates a position to which the light incident to the selected micro lens from the attention point P set in Step S13 is distributed to the imaging element 33. Then, the CPU 11 determines a pixel located at the position thus calculated as pixels to which light is distributed. It should also be noted that, in a case of selecting one micro lens, the CPU 11 selects a micro lens that is not yet selected.

In Step S15, the CPU 11 determines a weighting value of pixels selected based on the distance designated in Step S12.

In Step S16, the CPU 11 determines whether all pixels to which light is distributed have been specified, i.e. whether processing of calculating positions of pixels to which light is distributed has been performed for all of the micro lenses. In a case of a YES determination, the CPU 11 advances the processing to Step S17, and in a case of a NO determination, the CPU 11 advances the processing to Step S14.

In Step S17, the CPU 11 multiplies pixel values of pixels to which light from an attention point P is distributed by the weighting value determined in Step S15, and then calculates the arithmetic mean of the pixel values thus weighted.

In Step S18, the CPU 11 determines whether all of the pixels constituting a reconstructed plane have been set as the attention point. In a case of a YES determination, the CPU 11 advances the processing to Step S19, and in a case of a NO determination, the CPU 11 advances the processing to Step S13.

In Step S19, the CPU 11 outputs and displays a reconstructed image.

The configuration and processing of the image capturing apparatus 1 of the present embodiment have been explained above.

In the present embodiment, the image capturing apparatus 1 includes: an imaging element 33; a main lens 31 that condenses light from a subject toward the imaging element 33; a micro lens array 32 that is configured by a plurality kinds of micro lenses 32A and 32B with different focusing distances that is disposed between the imaging element 33 and the main lens 31 and causes light transmitted through the main lens 31 to form an image on the imaging element 33; and the CPU 11 that, in response to receiving a designation of a distance to a side of a subject that is photographed, performs weighting for each image that is imaged by the plurality kinds of micro lenses 32A and 32B of the imaging element 33 based on the distance so as to constitute one captured image.

For example, the image capturing apparatus 1 can generate a reconstructed image with high definition by suppressing a degree of influence on the reconstructed image from pixel values of pixels corresponding to an image in which micro lens blurring becomes greater due to the focusing distances of the micro lenses 32A and 32B to the image capture element not being focused. Furthermore, even in a case in which the distance between the main lens 31 and the micro lens array 32 is set to be closer in order to reduce in thickness the image capturing apparatus 1, it is also possible to suppress micro lens blurring regardless of a change in distance to a subject, by way of constituting micro lenses constituting this micro lens array 32 using micro lenses having a relatively short focusing distance as well as micro lenses having a relatively long focal length and by performing weighting of an image that is imaged by the respective micro lenses in accordance with the distance. Therefore, the image capturing apparatus 1 can acquire a reconstructed image with high definition over a wider range as compared to a conventional plenoptic camera.

It is to be noted that the present invention is not limited to the above-described embodiment and modifications, improvements, and the like, that fall within the range in which the object of the present invention can be achieved are included in the present invention.

Figure 12:
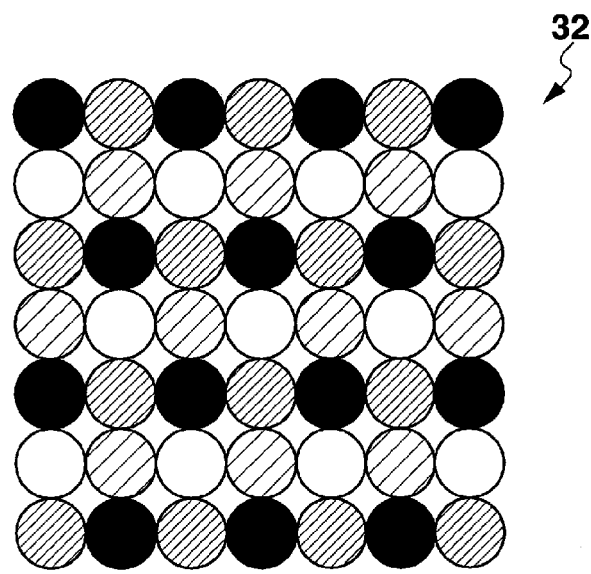
FIG. 12 is an arrangement example of micro lenses in a case of arranging four kinds of micro lenses to constitute a micro lens array in the abovementioned image capturing apparatus.

For example, although the two kinds of micro lenses 32A and 32B constitute the micro lens array 32 in the above-mentioned embodiment, the present invention is not limited thereto. For example, three or more kinds of micro lenses may be employed to constitute the micro lens array 32. FIG. 12 is an arrangement example of micro lenses in a case of arranging four kinds of micro lenses to constitute a micro lens array.

Figure 13:
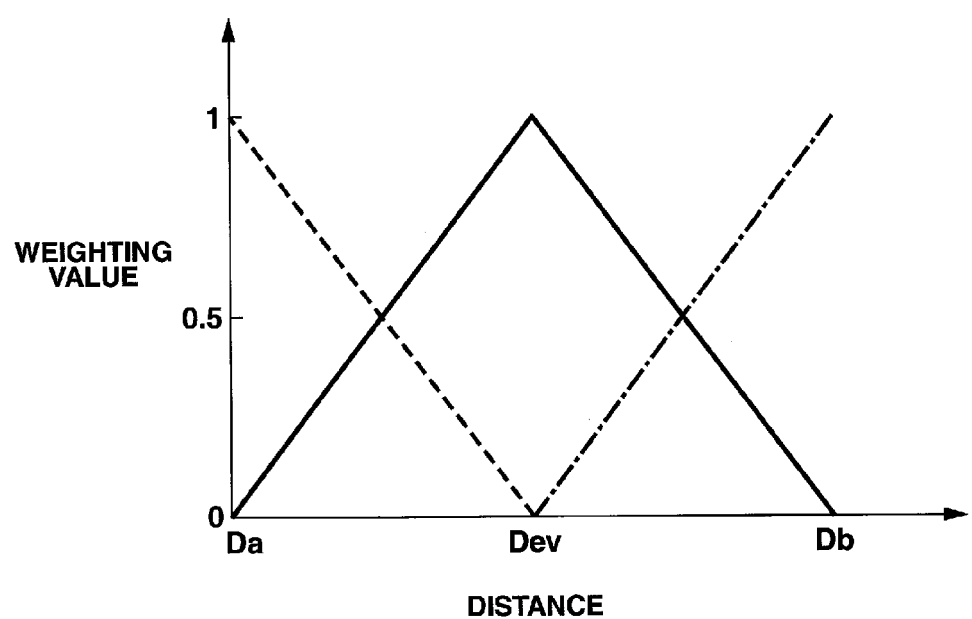
FIG. 13 is a graph showing a relationship of a weighting value corresponding to each micro lens in a case of employing three kinds of micro lenses to constitute a micro lens array in the abovementioned image capturing apparatus.
Figure 14:
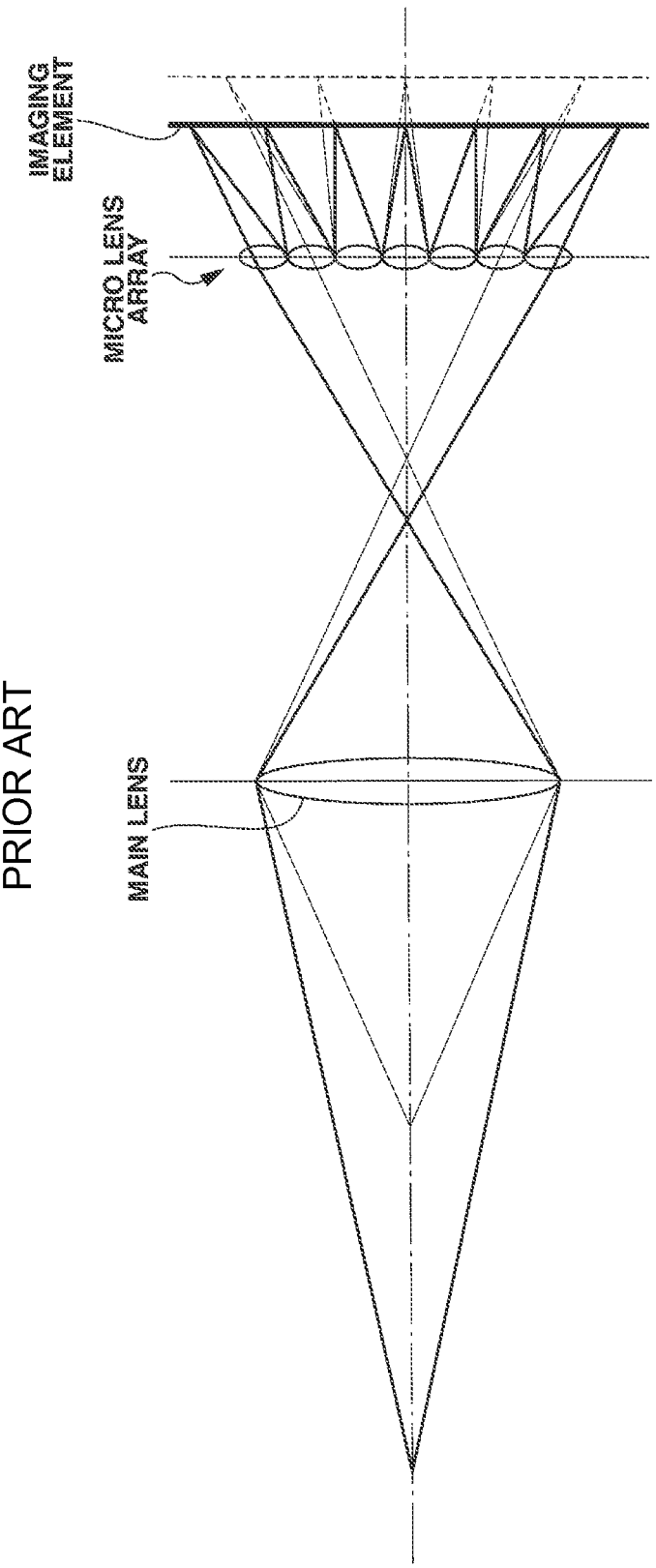
FIG. 14 is a schematic diagram showing a configuration example of an optical system of an image capturing unit constituting a conventional plenoptic camera.

Furthermore, in a case of employing three or more kinds of micro lenses to constitute the micro lens array 32, a weighting value for each micro lens may be changed appropriately. FIG. 13 is an example showing a relationship of a weighting value corresponding to micro lenses in a case of employing three kinds of micro lenses to constitute a micro lens array.

For example, although data of a light field image used upon generating data of a reconstructed image is photographed by the image capturing apparatus 1 in the above-mentioned embodiment, the present invention is not limited thereto.

In other words, the image capturing apparatus 1 may generate data of a reconstructed image by using data of a light field image photographed by another image capturing apparatus or another conventional plenoptic camera.

In other words, the present invention can be applied not only to the image capturing apparatus 1 having a photographic function, but also electronic equipment in general having a general image processing function without a photographic function. Specifically, for example, the present invention can be applied to personal computers, printers, television receivers, video cameras, navigation apparatuses, mobile phones, portable game machines, etc.

The above-described series of processes can be performed by hardware or can be performed by software.

In other words, the functional configurations shown in FIG. 1 are merely illustrative and thus are not particularly limited. Namely, it is sufficient that the imaging apparatus 1 have a function capable of performing the above-described series of processes as a whole, and what functional blocks are used to implement the function are not particularly limited to the examples in FIG. 1.

A single functional block may be configured by hardware alone or may be configured by software alone or may be configured by a combination thereof.

When a series of processes are performed by software, a program constituting the software is installed on a computer, etc., via a network or from a recording medium.

The computer may be a computer incorporated in dedicated hardware. Alternatively, the computer may be a computer capable of performing various functions by installing various programs, e.g., a general-purpose personal computer.

A recording medium including such a program is not only configured by the removable medium 22 in FIG. 1 which is distributed separately from the apparatus main body in order to provide a user with the program, but is also configured by, for example, a recording medium which is provided to the user, incorporated in advance in the apparatus main body. The removable medium 22 is configured by, for example, a magnetic disk (including a floppy disk), an optical disk, a magneto-optical disk, or the like. The optical disk may be configured by, for example, a CD-ROM (Compact Disk-Read Only Memory), a DVD (Digital Versatile Disk), or the like. The magneto-optical disk is configured by an MD (Mini-Disk) or the like. The recording medium which is provided to the user, incorporated in advance in the apparatus main body is configured by, for example, the ROM 12 in FIG. 1 having a program recorded therein, a hard disk included in the storage unit 19 in FIG. 1, or the like.

Note that in the specification the steps describing a program recorded in a recording medium not only include processes that are performed in the order of the steps in a time-series manner, but also include processes that are not necessarily processed in a time-series manner but are performed in parallel or individually.

Although the embodiment of the present invention has been described above, the embodiment is merely illustrative and do not limit the technical scope of the present invention.

The present invention can employ various other embodiments, and furthermore, various changes such as omission and replacement may be made therein without departing from the true spirit of the present invention. These embodiments and modifications thereto are included in the true scope and spirit of the present invention described in the specification, etc., and are included in the inventions described in the appended claims and in the range of equivalency of the inventions.

What is claimed is:

1. An image processing apparatus which performs image processing on an image captured by an image capturing apparatus that includes (i) an imaging element, (ii) a main lens that condenses light from a subject toward the imaging element, and (iii) a micro lens array that is configured by a plurality of kinds of micro lenses with different focusing distances and that is disposed between the imaging element and the main lens and causes light transmitted through the main lens to form an image on the imaging element, the image processing apparatus comprising:
    an image processor that, in response to receiving a designation of a distance to a side of the subject in the image that is photographed by the image capturing apparatus, performs weighting for each image that is imaged by the plurality of kinds of micro lenses based on the distance so as to constitute one captured image,
    wherein the plurality of kinds of micro lenses comprise a first micro lens having a first focusing distance and a second micro lens having a second focusing distance that is greater than the first focusing distance, and
    wherein, in a case of the distance being greater than a predetermined distance, the image processor makes a first weighting value of a first image formed by the first micro lens smaller than a second weighting value of a second image formed by the second micro lens, and in a case of the distance being smaller than the predetermined distance, the image processor makes the first weighting value greater than the second weighting value.

2. The image processing apparatus according to claim 1, wherein:
    a value of the weighting differs for each kind of the plurality of kinds of micro lenses, and
    the image processor performs the weighting for each image that is imaged with a value associated with a respective one of the plurality of kinds of micro lenses.

3. The image processing apparatus according to claim 1, wherein:
    the image processor sets a value of the weighting of an image that is imaged by one of the plurality of kinds of micro lenses in which micro lens blurring occurs at the distance to be smaller than a value of the weighting of an image that is imaged by one of the plurality of kinds of micro lenses in which micro lens blurring does not occur at the distance.

4. An image processing method performing image processing on an image captured by an image capturing apparatus, the image capturing apparatus including (i) an imaging element, (ii) a main lens that condenses light from a subject toward the imaging element, and (iii) a micro lens array that is configured by a plurality of kinds of micro lenses with different focal lengths and that is disposed between the imaging element and the main lens and causes light transmitted through the main lens to form an image on the imaging element, the method comprising:
    in response to receiving a designation of a distance to a side of the subject in the image that is photographed by the image capturing apparatus, performing weighting for each image that is imaged by the plurality of kinds of micro lenses based on the distance so as to constitute one captured image,
    wherein the plurality of kinds of micro lenses comprise a first micro lens having a first focusing distance and a second micro lens having a second focusing distance that is greater than the first focusing distance, and
    wherein in performing the weighting, in a case of the distance being greater than a predetermined distance, a first weighting value of a first image formed by the first micro lens is made smaller than a second weighting value of a second image formed by the second micro lens, and in a case of the distance being smaller than the predetermined distance, the first weighting value is made greater than the second weighting value.

5. A non-transitory computer-readable storage medium storing thereon a program that causes a computer of an image processing apparatus to perform image processing on an image captured by an image capturing apparatus, the image capturing apparatus including (i) an imaging element, (ii) a main lens that condenses light from a subject toward the imaging element, and (iii) a micro lens array that is configured by a plurality kinds of micro lenses with different focal lengths and that is disposed between the imaging element and the main lens and causes light transmitted through the main lens to form an image on the imaging element, the program causing the computer of the image processing apparatus to perform processing comprising:
    in response to receiving a designation of a distance to a side of the subject in the image that is photographed by the image capturing apparatus, performing weighting for each image that is imaged by the plurality of kinds of micro lenses based on the distance so as to constitute one captured image,
    wherein the plurality of kinds of micro lenses comprise a first micro lens having a first focusing distance and a second micro lens having a second focusing distance that is greater than the first focusing distance, and
    wherein in performing the weighting, in a case of the distance being greater than a predetermined distance, a first weighting value of a first image formed by the first micro lens is made smaller than a second weighting value of a second image formed by the second micro lens, and in a case of the distance being smaller than the predetermined distance, the first weighting value is made greater than the second weighting value.

6. The image processing apparatus according to claim 1, wherein the micro lens array is configured such that the first micro lens and the second micro lens are arranged alternately.

7. The image processing apparatus according to claim 1, wherein the image processor constitutes the one captured image by multiplying each pixel value of the first image by the first weighting value, multiplying each pixel value of the second image by the second weighting value, and calculating a weighted mean.

* * * * *